(12) United States Patent
Soto (10) Patent No.: US 9,041,697 B2
(45) Date of Patent: May 26, 2015

(54) APPARATUS AND METHOD FOR USING AN LED FOR BACKLIGHTING AND AMBIENT LIGHT SENSING

(75) Inventor: Walter Soto, San Clemente, CA (US)

(73) Assignee: Broadcom Corporation, Irvine, CA (US)

(*) Notice: Subject to any disclaimer, the term of this patent is extended or adjusted under 35 U.S.C. 154(b) by 133 days.

(21) Appl. No.: 13/045,038

(22) Filed: Mar. 10, 2011

(65) Prior Publication Data

US 2012/0194493 A1 Aug. 2, 2012

Related U.S. Application Data

(60) Provisional application No. 61/437,379, filed on Jan. 28, 2011.

(51) Int. Cl.
G06F 3/038 (2013.01)
G09G 5/00 (2006.01)
G09G 3/34 (2006.01)

(52) U.S. Cl.
CPC ........ *G09G 3/3406* (2013.01); *G09G 2320/064* (2013.01); *G09G 2360/144* (2013.01); *G09G 2360/16* (2013.01)

(58) Field of Classification Search
USPC ................................................. 345/102, 207
See application file for complete search history.

(56) References Cited

U.S. PATENT DOCUMENTS

| 6,144,165 | A * | 11/2000 | Liedenbaum | ............... 315/169.3 |
| 7,072,587 | B2 | 7/2006 | Dietz et al. | |
| 2004/0095402 | A1* | 5/2004 | Nakano | ............... 346/102 |
| 2008/0180414 | A1 | 7/2008 | Fung et al. | |
| 2008/0238856 | A1* | 10/2008 | Bhowmik et al. | ............... 345/102 |
| 2008/0248837 | A1* | 10/2008 | Kunkel | ............... 455/566 |
| 2009/0115757 | A1* | 5/2009 | Bae | ............... 345/207 |
| 2009/0152445 | A1* | 6/2009 | Gardner, Jr. | ............... 250/214 AL |
| 2011/0043534 | A1* | 2/2011 | Cheng | ............... 345/589 |

FOREIGN PATENT DOCUMENTS

| CN | 1514992 A | 7/2004 |
| CN | 101237733 A | 8/2008 |
| CN | 101777310 A | 7/2010 |
| EP | 1 175 711 | 1/2002 |
| JP | 2009-123581 | 6/2009 |
| WO | WO 99/40559 A2 | 8/1999 |
| WO | WO-03/083818 A1 | 10/2003 |

OTHER PUBLICATIONS

European Search Report for Application No. EP 12000244.9, dated Apr. 3, 2012, 13 pages.

(Continued)

*Primary Examiner* — Kenneth B Lee, Jr.
(74) *Attorney, Agent, or Firm* — Sterne, Kessler, Goldstein & Fox P.L.L.C.

(57) ABSTRACT

Embodiments of a backlight module for illuminating a liquid crystal display (LCD) and sensing ambient light are provided herein. The backlight module includes a light-emitting diode (LED) array and a backlight controller. The backlight controller is configured to forward bias the LED array to backlight the LCD and reverse bias the LED array to sense the ambient light level. The backlight controller is configured to adjust the brightness of the LED array based on the current ambient lighting conditions sensed.

19 Claims, 5 Drawing Sheets

(56) References Cited

OTHER PUBLICATIONS

Patent Abstract of Japan, English Language abstract for JP 2009-123581, Patent & Utility Model Gazette DB, Japanese Patent Office, 1 page.

Office Action for related Chinese Patent Application No. 20120020344, mailed Jan. 3, 2014; 8 pages.

English-language abstract for Chinese Patent Application Publication No. 101777310 A; 1 page.

* cited by examiner

APPARATUS AND METHOD FOR USING AN LED FOR BACKLIGHTING AND AMBIENT LIGHT SENSING

CROSS REFERENCE TO RELATED APPLICATIONS

This application claims the benefit of U.S. Provisional Patent Application No. 61/437,379, filed Jan. 28, 2011, entitled "Apparatus and Method for Using an LED for Backlighting and Ambient Light Sensing," which is incorporated herein by reference in its entirety.

FIELD OF THE INVENTION

This application relates generally to backlighting and ambient light sensing and more particularly to backlighting and ambient light sensing using a light-emitting diode (LED).

BACKGROUND

Liquid crystal displays (LCDs) are used in a wide range of electronic devices and appliances, from small handheld mobile phones all the way up to large-panel TVs. In general, three main types of LCDs exist and each has characteristics that suit different applications. These three LCD types include: transmissive, reflective, and transflective LCDs. Transmissive and transflective LCDs are of particular relevance to the description herein and are described further below.

A transmissive LCD provides high brightness, contrast, and color saturation and is characterized by its use of a backlight (i.e., an internal light source positioned at the back of the LCD) to provide illumination. The backlight in a transmissive display is typically constructed from white light-emitting diodes (LEDs). The power consumption associated with these backlight LEDs can be relatively high because they are often driven with sufficient power to provide enough light output to compete with the strongest ambient light environments that a device may be operated within, such as outdoor environments where sunlight can be strong.

One solution used to combat the issue of high power consumption is the inclusion and positioning of an ambient light sensor on the outer surface of the LCD. The ambient light sensor is used to estimate the ambient light conditions of the environment where the LCD is currently operating, which is then used to adjust the brightness of the backlight LEDs to meet, but not greatly exceed, the brightness required for the ambient light conditions. Although this solution can improve power consumption, the addition of an ambient light sensor adds cost to the display and increases its overall size. In addition, conventional implementations of transmissive displays that utilize ambient light sensors do not take into consideration the amount of light that the display's own screen adds to the estimated ambient light conditions sensed. Therefore, the brightness of the screen is often adjusted to a sub-optimal setting.

A transflective LCD combines both transmissive functions and reflective functions into one display. In dark or low ambient level conditions, the backlight is turned on and the image is primarily displayed in the transmissive mode. In bright ambient light situations, such as under strong sunlight, the reflective mode primarily functions to illuminate the LCD and the backlight may either be turned on to aid the display of an image or turned off to save power. In the reflective mode, the LCD is specifically illuminated by an external light source, which passes through the front of the LCD and is reflected back by an embedded reflector in the back of the LCD. Because a transflective LCD operating in the reflective mode relies on external light to display an image, it has low power consumption and good readability in high ambient light environments.

To estimate current ambient light conditions such that, in brighter environments, the brightness of the backlight can be reduced to allow the reflective mode of a transflective display to take over, an ambient light sensor is typically used. Although this solution can improve power consumption, the addition of an ambient light sensor, as noted above, adds cost to and increases the overall size of the display.

Therefore, what is needed is an apparatus and method for estimating ambient light conditions for an LCD, while at the same time eliminating the need for a traditional ambient light sensor and the drawbacks associated therewith.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. Example Operating Environment

Figure 1:
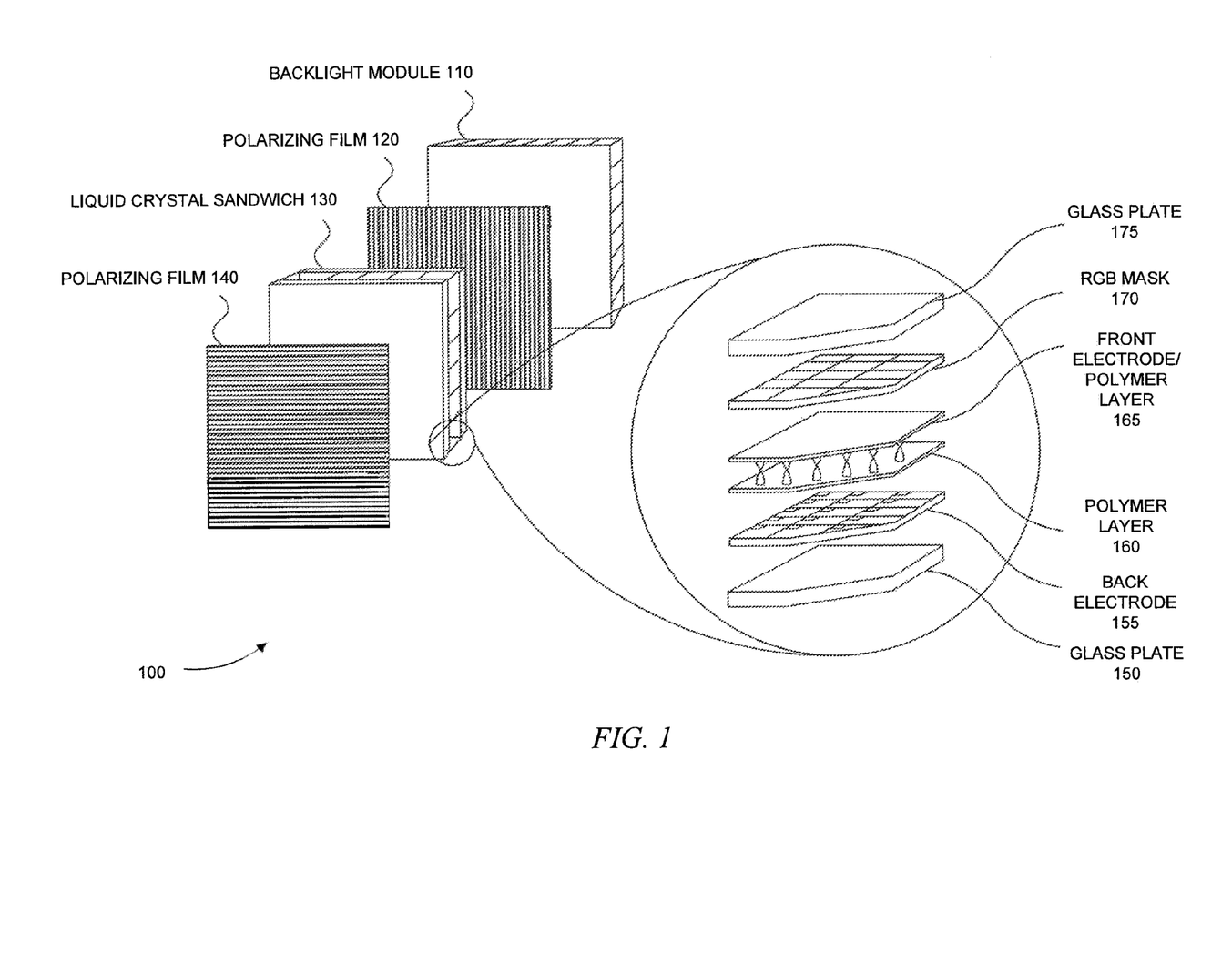
FIG. 1 illustrates an exploded view of an exemplary LCD.

FIG. 1 illustrates an exploded view of an exemplary transmissive or transflective LCD 100 in which embodiments of the present invention can be implemented. LCD 100 specifically includes a backlight module 110, a first polarizing film 120, a liquid crystal sandwich 130, and a second polarizing film 140. LCD 100 can be used within several different devices, including a mobile phone, video camera, television, or monitor, to name a few.

In operation, liquid crystal sandwich 130 is controlled by a graphics controller (not shown) to allow varying amounts of light from backlight module 110 to pass through different portions of second polarizing film 140. By controlling the amount of light that passes through portions of second polarizing film 140, a desired image can be produced by LCD 100 as will be explained further below.

In order to produce light that can be filtered by liquid crystal sandwich 130, backlight module 110 includes an array of LEDs (not shown) that can be positioned along one or more edges of a back panel of LCD 100 or dispersed over the area of a back panel of LCD 100. The light produced by backlight module 110 initially passes through first polarizing film 120 that is configured to convert the light into light with a single polarization. For example, first polarizing film 120 can be a wire-grid polarizer that is configured to transmit horizontal components of the light passing through it while absorbing and/or reflecting vertical components. In general, polarizing film 120 can be configured to transmit any single polarization angle.

The polarized light from first polarizing film 120 is subsequently processed by liquid crystal sandwich 130, which has been broken down on the right side of FIG. 1 to further illustrate and describe its constituent components. In particular, liquid crystal sandwich 130 includes (starting from the components closest to the back of LCD 100) a first glass plate 150, a back electrode 155, a first polymer layer 160, a front electrode/second polymer layer 165, an RGB mask 170, and a second glass plate 175.

Between the first polymer layer 160 and second polymer layer 165 are liquid crystals (e.g., nematic liquid crystals) that exhibit certain optical properties that can be controlled by an applied electric field. More specifically, and in one embodiment, twisted configurations (e.g., helical structures) of liquid crystal molecules are formed between the two polymer layers, which are separated by a series of spacers (not shown). Each polymer layer has "grooves" on its surface that are oriented at 90 degrees relative to one another such that the two ends of each configuration of liquid crystal molecules align to the grooves, twisting each configuration by 90 degrees when no external electric field is applied. The twist of each configuration of liquid crystal molecules reorients or bends the light that has passed through first polarizing film 120 and glass plate 150 by 90 degrees, allowing it to eventually pass through glass plate 175 and second polarizing film 140, which is oriented 90 degrees out of phase with first polarizing film 120.

By applying an external electric field across the layer of liquid crystals between polymer layers 160 and 165, each twisted configuration of liquid crystal molecules can be untwisted and aligned parallel to the electric field. Adjusting the intensity of the applied electrical field allows the amount of untwisting to be controlled and, thereby, the amount of light that is able to eventually pass through second polarizing film 140.

Back electrode 155 and front electrode 165 are specifically used to generate and apply an electric field across the layer of liquid crystals. For example, and in one embodiment, the display area of LCD 100 is divided into a two-dimensional array of pixels, which are each further divided into three areas. Back electrode 155 and front electrode 165 are configured to generate and apply a uniquely controlled electric field across each portion of the layer of liquid crystals corresponding to the three areas of each pixel. The light passing through the three areas of each pixel is subsequently processed by RGB mask 170, which respectively filters the light passing through the three areas of each pixel with a red, green, and blue color filter. Thus, back electrode 155 and front electrode 165 can be controlled to adjust the amount of red, green, and blue light that makes up each blended pixel color displayed by LCD 100 and, consequently, the ultimate image displayed.

In one embodiment, an active matrix scheme is implemented by LCD 100 to generate and apply different electric fields across different portions of the layer of liquid crystals. In another embodiment, a passive matrix scheme is used.

It should be noted that the graphics controller for controlling back electrode 155 and front electrode 165 is not shown in FIG. 1. It should be further noted that LCD 100 represents only one exemplary LCD in which embodiments of the present invention can be implemented. For example, and as would be appreciated by one of ordinary skill in the art, embodiments of the present invention can be implemented in any reasonable transmissive or transflective LCD that uses an array of LEDs to provide backlight illumination.

2. Conventional Ambient Light Sensor

Often the power consumption associated with LEDs in the backlight of an LCD, such as LCD 100, can be relatively high because the LEDs are often driven with sufficient power to provide enough light output to compete with the strongest ambient light environments a device may be operated within, such as outdoor environments where sunlight can be strong.

One solution used to combat the issue of high power consumption is the inclusion and positioning of an ambient light sensor on the surface of an LCD. The ambient light sensor is used to estimate the ambient light conditions of the environment where the LCD is currently operating, which is then used to adjust the brightness of the backlight LEDs to meet, but not greatly exceed, the brightness required for the ambient light conditions.

Figure 2:
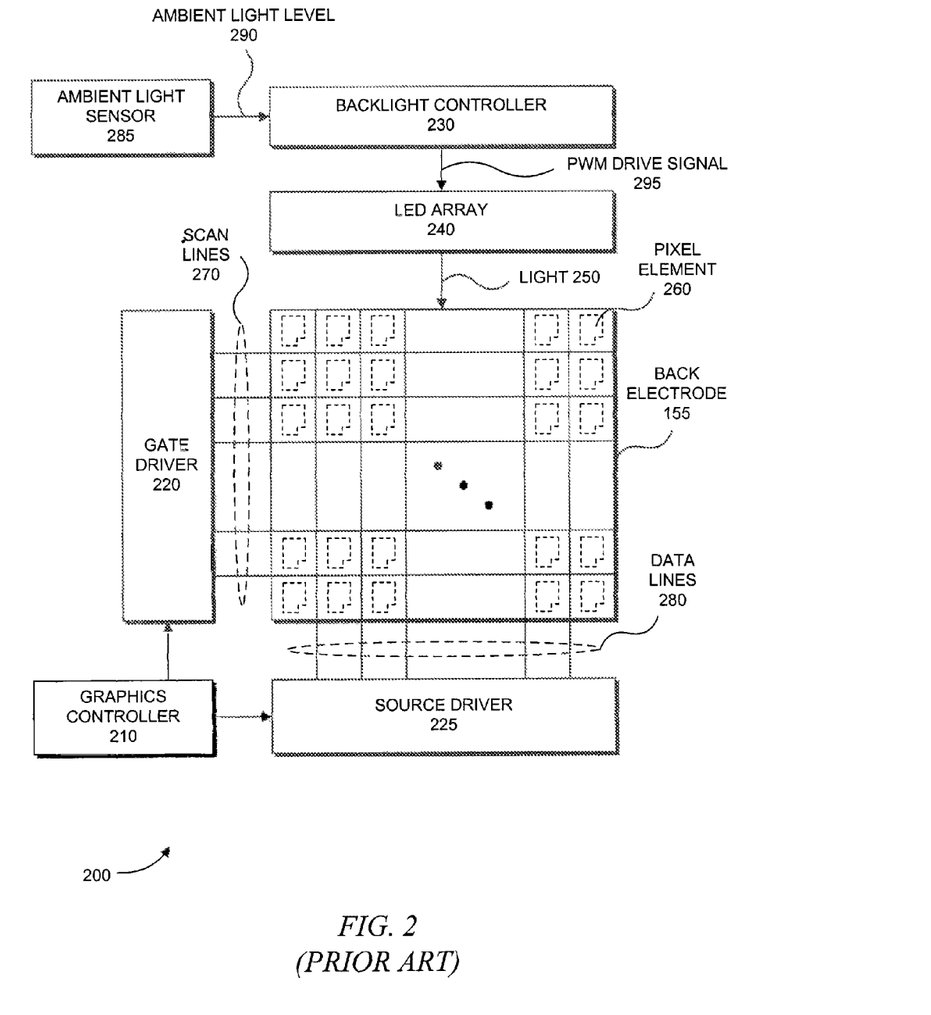
FIG. 2 illustrates a partial block diagram of an LCD that uses a traditional ambient light sensor.

FIG. 2 illustrates a block diagram of an exemplary control structure 200, for controlling LCD 100, that uses a traditional ambient light sensor 285 as described above. Control structure 200 specifically includes a graphics controller 210 for controlling back electrode 155 via gate driver 220 and source driver 225, and a backlight controller 230 for controlling LED array 240 containing LEDs that provide light 250 that passes through back electrode 155.

In one embodiment, back electrode 155 is configured to be operated in an active matrix scheme and includes an array of pixel elements 260 that each correspond to one color (i.e., red, green, or blue) of a complete pixel. Each pixel element specifically includes a transistor and a capacitor (one end of this capacitor is disposed on front electrode 165 illustrated in FIG. 1). This transistor/capacitor pair is often referred to as a thin film transistor (TFT).

Gate driver 220 uses a series of scan lines 270 to drive the gates of the transistors of each pixel element 260, thereby turning the transistors on and off. Source driver 225 uses a series of data lines 280 to drive either the source or drain of the transistors of each pixel element 260 to charge each associated capacitor when the transistor is on. Graphics controller 210 is configured to control gate driver 220 and source driver 225 to turn on and off select ones of pixel elements 260 and to charge each capacitor of pixel elements 260 to a desired voltage level. The voltage across each capacitor induces a proportional electric field across the corresponding area of the liquid crystal layer, which in turn changes the orientation or twist of the configurations of liquid crystal molecules within that area. As discussed above, the amount of twist of the liquid crystal configurations effects the amount of light 250 that is eventually passed through to the output display of LCD 100. Thus, by appropriately controlling the amount of charge stored on each capacitor of pixel elements 260, graphics controller 210 can format the output display of LCD 100 to display a desired image.

It should be noted that the active matrix scheme discussed above represents only one potential scheme for controlling the orientation of the liquid crystals associated with each pixel element 260. Other possible control schemes are possible without departing from the scope and spirit of the present invention as would be appreciated by one of ordinary skill in the art. For example, and in another embodiment, a passive matrix scheme can be used.

Backlight controller 230 is further included in control structure 200 and is configured to supply power to LED array 240 and control the brightness of LED array 240 using a pulse width modulation (PWM) dimming technique. Using the PWM dimming technique, backlight controller 230 modulates the time that the LEDs in LED array 240 are on using a PWM drive signal 295. The brightness of the LCD roughly equates to the duty cycle of PWM drive signal 295.

The ability to control brightness is coupled with traditional ambient light sensor 285 so that the brightness of LED array 240 can be adjusted based on the current lighting conditions of the environment where the device is being used. For example, in a room where the sensed ambient light level 290 is fairly bright, backlight controller 230 can adjust the duty cycle of PWM drive signal 295 to provide a high brightness level. However, in a room where the ambient light level 290 is fairly dim, backlight controller 230 can adjust the duty cycle of PWM drive signal 295 to provide a low brightness level.

Although the ability to control brightness for sensed ambient light conditions can improve power consumption, the addition of traditional ambient light sensor 285 adds cost to the display and increases its overall size. In addition, many implementations of displays that utilize ambient light sensors, such as ambient light sensor 285, do not take into consideration the amount of light that the display's own screen adds to the estimated ambient light conditions sensed. Therefore, the brightness of the screen is often adjusted to a suboptimal setting.

Embodiments of the present invention, discussed further below, are directed to apparatuses and methods for estimating ambient light conditions for an LCD, while at the same time eliminating the need for a traditional ambient light sensor, such as ambient light sensor 285, and the drawbacks associated therewith.

3. Backlight Ambient Light Sensor

Figure 3:
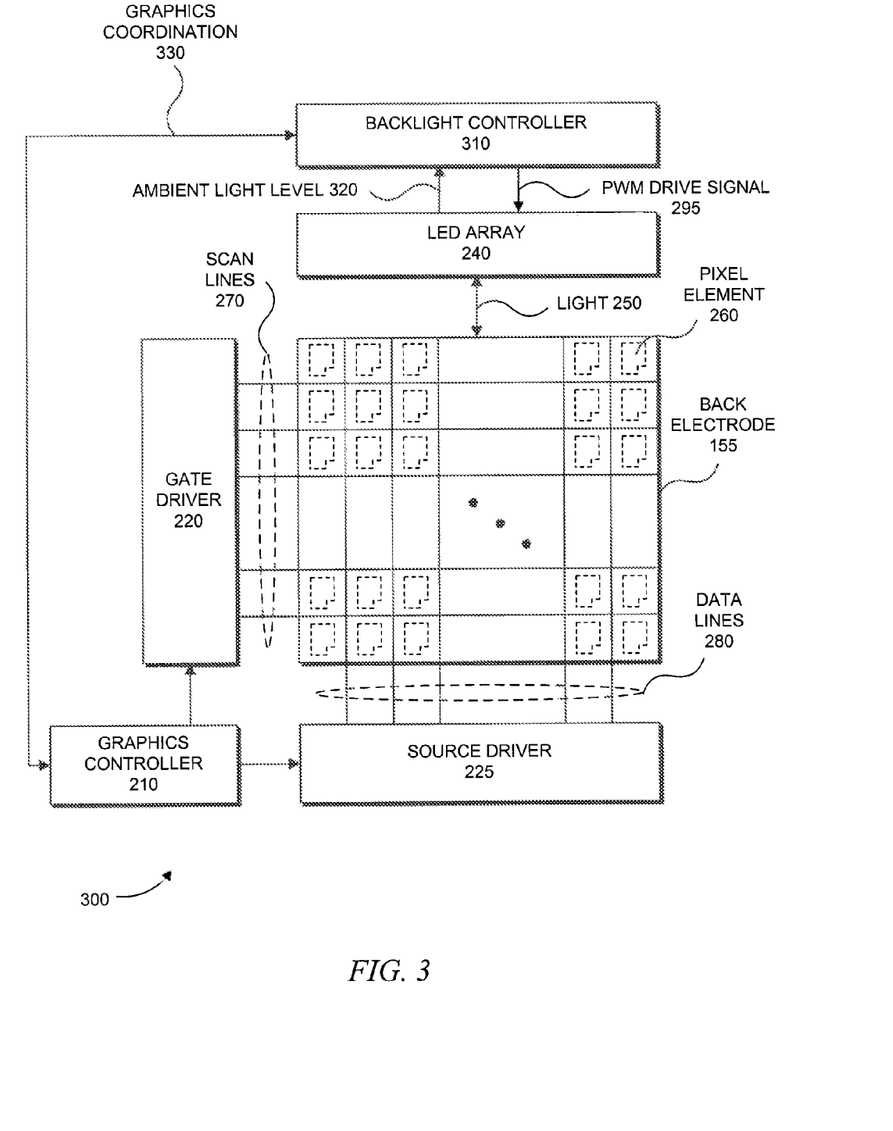
FIG. 3 illustrates a block diagram of an LCD that uses a backlight ambient light sensor, according to embodiments of the present invention.

FIG. 3 illustrates a block diagram of an exemplary control structure 300 for controlling LCD 100, according to embodiments of the present invention. Control structure 300 specifically includes substantially similar components as control structure 200 illustrated in FIG. 2. However, traditional ambient light sensor 285 has been eliminated and replaced by a backlight ambient light sensor (BALS) (not shown). In addition, backlight controller 230 illustrated in FIG. 2 has been further replaced by a modified backlight controller 310.

In operation, backlight controller 310 is configured to supply power to LED array 240 and control the brightness of LED array 240 using a pulse width modulation (PWM) dimming technique. Using the PWM dimming technique, backlight controller 310 modulates the time that the LEDs in LED array 240 are on using PWM drive signal 295. The brightness of the LCD roughly equates to the duty cycle of PWM drive signal 295.

In an embodiment, one or more of the LEDs used to perform backlighting in LED array 240 are further used as ambient light sensors by backlight controller 310, thereby functioning as a BALS. By reusing one or more of the LEDs to perform the extra functionality of ambient light sensing, the traditional ambient light sensor can be eliminated. In order for the LEDs to perform the dual-functionality mentioned above, the LEDs are forward biased to produce light and reverse biased to perform ambient light sensing by backlight controller 310.

In a further embodiment of the present invention, the one or more dual-functioning LEDs of LED array 240 are reverse biased and function as ambient light sensors during the phase of PWM drive signal 295 that traditionally turns the LEDs off. In a variant of this embodiment, the one or more dual-functioning LEDs are reverse biased and function as ambient light sensors only during select cycles of PWM drive signal 295; i.e., during some but not every cycle of PWM drive signal 295. For example, the one or more dual-functioning LEDs are reverse biased and function as ambient light sensors for one in every N cycles of PWM drive signal 295, where N is an integer number. In another example, the one or more dual-functioning LEDs are reverse biased and function as ambient light sensors for M cycles in every N cycles of PWM drive signal 295, where M and N are integer numbers and M is less than N.

The brightness of LED array 240 can subsequently be adjusted based on the current lighting conditions sensed by the one or more LEDs in LED array 240. For example, in a room where the sensed ambient light level 320 is fairly bright, backlight controller 310 can adjust the duty cycle of PWM drive signal 295 to provide a high brightness level. However, in a room where the sensed ambient light level 320 is fairly dim, backlight controller 310 can adjust the duty cycle of PWM drive signal 295 to provide a low brightness level.

In another embodiment of the present invention, additional control logic can be further utilized by backlight controller 310 to receive and use information regarding the state of the crystalline material of LCD 100 to interpret and/or adjust the ambient light level sensed by the one or more dual-functioning LEDs. More specifically, the current orientation or twist of the configurations of liquid crystal molecules corresponding to one or more pixel elements 260 of LCD 100 at the time the ambient light level is sensed by the one or more dual-functioning LEDs can be used to interpret and/or adjust the sensed ambient light level 320.

For example, if the current orientation or twist of the configurations of liquid crystal molecules is such that less light is allowed to pass through the LCD display than what would otherwise be possible, then the ambient light level sensed can be inflated and/or interpreted to correspond to an actual ambient light level having a brightness greater than what was actually sensed. This information regarding the state of the crystalline material of LCD 100 can be in the form of the voltage across the capacitor corresponding to one or more pixel elements 260, or the amount of charge stored thereon, and can be received by backlight controller 310 from graphics controller 210 via graphics coordination signal 330, as illustrated in FIG. 3.

In another embodiment, additional control logic can be farther utilized by backlight controller 310 to receive and use information regarding the brightness of a number of pixel elements 260 of LCD 100 to interpret and/or adjust the ambient light level sensed by the one or more dual-functioning LEDs. For example, the brightness, or luma, of a pixel element 260 can be calculated by graphics controller 210 based on a weighted sum of its red, green, and blue components (e.g., Pixel_Luma=3R+B+4G, where R, B, and G represent the red, green, and blue components of a pixel during the display of a given image). Graphics controller 210 can calculate the brightness for a number of pixel elements 260 for one or more images displayed by LCD 100 and keep track of the number of pixel elements with a brightness that falls within two or more brightness ranges. In other words, graphics controller 210 can create a histogram containing the number of pixel elements that have a brightness that falls within two or more brightness ranges. This data representing the number of pixel elements having a brightness that falls within the two or more brightness ranges can then be passed to backlight controller 310 to interpret and/or adjust the sensed ambient light level 320.

In yet another embodiment, backlight controller 310 can signal to graphics controller 210, via graphics coordination signal 330, to adjust the crystalline material to ensure a portion of the ambient light is able to pass through the display of LCD 100 so that it can be sensed by the LEDs in LED array 240 during the off states of one or more cycles of PWM drive signal 295. Backlight controller 310 can, in a variant of this embodiment, signal to graphics controller 210, via graphics coordination signal 330, to adjust only the crystalline material corresponding to particular regions or pixels of LCD 100 to ensure a portion of the ambient light is able to pass through the display.

Figure 4:
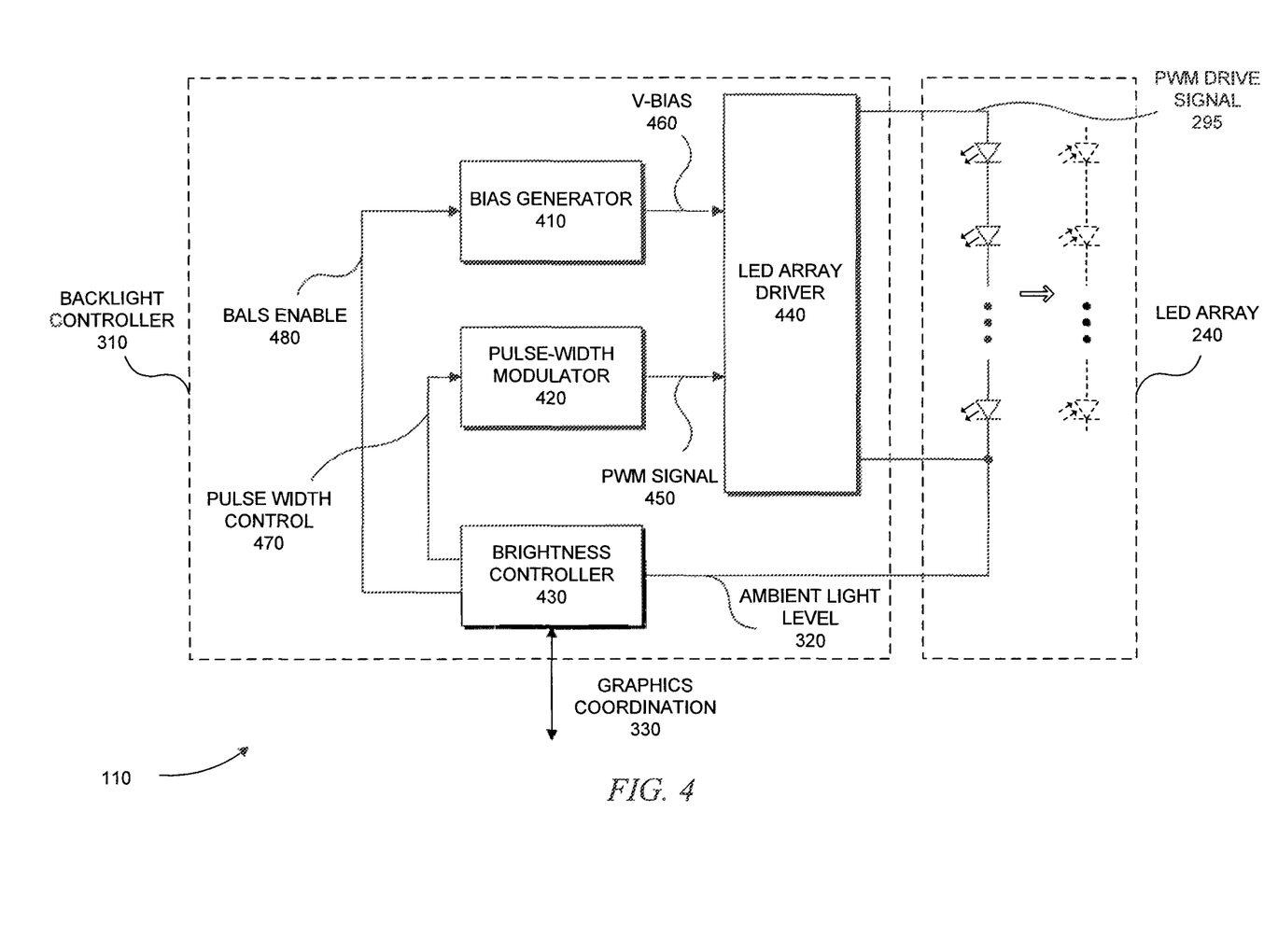
FIG. 4 illustrates an exemplary backlight module, according to embodiments of the present invention.

FIG. 4 illustrates an exemplary block diagram of backlight module 110 that includes both backlight controller 310 and LED array 240, according to embodiments of the present invention. As illustrated in FIG. 4, backlight controller 310 includes a bias generator 410, a pulse-width modulator 420, a brightness controller 430, and an LED array driver 440.

In operation, pulse-width modulator 420 is configured to provide a pulse-width modulated (PWM) signal 450 to LED array driver 440. Each period of PWM signal 450 has an on time and an off time. LED array driver 440 is configured to forward bias one or more of the LEDs in LED array 240 during the on time of PWM signal 450 and to reverse bias one or more of the LEDs in LED array 240 during at least some of the off times of PWM signal 450.

During the portion of time that the one or more LEDs in LED array 240 are forward biased, light is emitted and LCD 100 is illuminated. During the portion of time that the one or more LEDs in LED array 240 are reverse biased, ambient light is sensed. In general, the one or more LEDs in LED array 240 are transformed into photo diodes when reverse biased and produce a current, often referred to as a photocurrent, that is roughly proportional to the amount of light striking their surfaces through the layers of LCD 100. Brightness controller 430 is able to measure or sense this current via ambient light level signal 320, as illustrated in FIG. 3.

In one embodiment, brightness controller 430 is configured to modulate the duty-cycle of PWM signal 450 based on the ambient light level sensed by LED array 240. For example, in a room where the sensed ambient light level 320 is fairly bright, brightness, controller 430 can adjust the duty cycle of PWM signal 450 to provide a high brightness level. However, in a room where the sensed ambient light level 320 is fairly dim, brightness controller 430 can adjust the duty cycle of PWM signal 450 to provide a low brightness level. The duty cycle is specifically adjusted via pulse width control signal 470, as illustrated in FIG. 4.

In a further embodiment, additional control logic can be further utilized by brightness controller 430 to receive and use information regarding the state of the crystalline material of LCD 100 to interpret and/or adjust the ambient light level sensed by the one or more dual-functioning LEDs. More specifically, the current orientation or twist of the configurations of liquid crystal molecules corresponding to one or more pixel elements of LCD 100 at the time the ambient light level is sensed by the one or more dual-functioning LEDs can be used to interpret and/or adjust the sensed ambient light level 320.

For example, if the current orientation or twist of the configurations of liquid crystal molecules is such that less light is allowed to pass through the LCD display than what would otherwise be possible, then the ambient light level sensed can be inflated and/or interpreted to correspond to an actual ambient light level having a brightness greater than what was actually sensed. This information regarding the state of the crystalline material of LCD 100 can be in the form of the voltage across the capacitor corresponding to one or more pixel elements, or the amount of charge stored thereon, and can be received by brightness controller 430 from the graphics controller of LCD 100 via graphics coordination signal 330, as illustrated in FIG. 4.

In another embodiment, additional control logic can be further utilized by brightness controller 430 to receive and use information regarding the brightness of a number of pixel elements of LCD 100 to interpret and/or adjust the ambient light level sensed by the one or more dual-functioning LEDs. For example, the brightness, or luma, of a pixel element can be calculated by graphics controller 210 based on a weighted sum of its red, green, and blue components (e.g., Pixel_Luma=3R+B+4G, where R, B, and G represent the red, green, and blue components of a pixel during the display of a given image). Graphics controller 210 can calculate the brightness for a number of pixel elements for one or more images displayed by LCD 100 and keep track of the number of pixel elements that have a brightness that falls within two or more brightness ranges. In other words, graphics controller 210 can create a histogram containing the number of pixel elements that have a brightness that falls within two or more brightness ranges. This data representing the number of pixel elements having a brightness that falls within the two or more brightness ranges can then be passed via graphics coordination signal 330 to brightness controller 430 to interpret and/or adjust the sensed ambient light level 320.

In yet another embodiment, brightness controller 430 can signal to the graphics controller, via graphics coordination signal 330, to adjust the crystalline material to ensure a portion of the ambient light is able to pass through the display of LCD 100 so that it can be sensed by the LEDs in LED array 240 during the off states of one or more cycles of PWM signal 450. Brightness controller 430 can, in a variant of this embodiment, signal to the graphics controller, via graphics coordination signal 330, to adjust only the crystalline material corresponding to particular regions or pixels of LCD 100 to ensure a portion of the ambient light is able to pass through the display.

Bias generator 410 is configured to provide a forward bias voltage to the LED array driver 440 during the on time of PWM signal 450 for forward biasing LED array 240 and a reverse bias voltage to LED array driver 440 during the off time of PWM signal 450 for reverse biasing the LLD array. These two bias voltages are specifically provided to LED array driver 440 via V-BIAS signal 460, as illustrated in FIG. 4.

In one embodiment, brightness controller 430 is further configured to control bias generator 410, via BALS enable signal 480, to provide the reverse bias voltage to LED array driver 440 only during the off time of select periods or cycles of PWM signal 450. For example, backlight controller 430 can be configured to control bias generator 410 to provide the reverse bias voltage to LED array driver 440 only during the off time of one out of every N periods of PWM signal 450, where N is an integer number. In another example, backlight controller 430 can be configured to control bias generator 410 to provide the reverse bias voltage to LED array driver 440 for M cycles in every N cycles of PWM signal 450, where M and N are integer numbers and M is less than N.

It should be noted that PWM drive signal 295, provided by LED array driver 440, is substantially coordinated and identical to PWM signal 450. However, the strength of PWM drive signal 295 is generally greater in magnitude in order to forward bias and reverse bias LED array 240.

Figure 5:
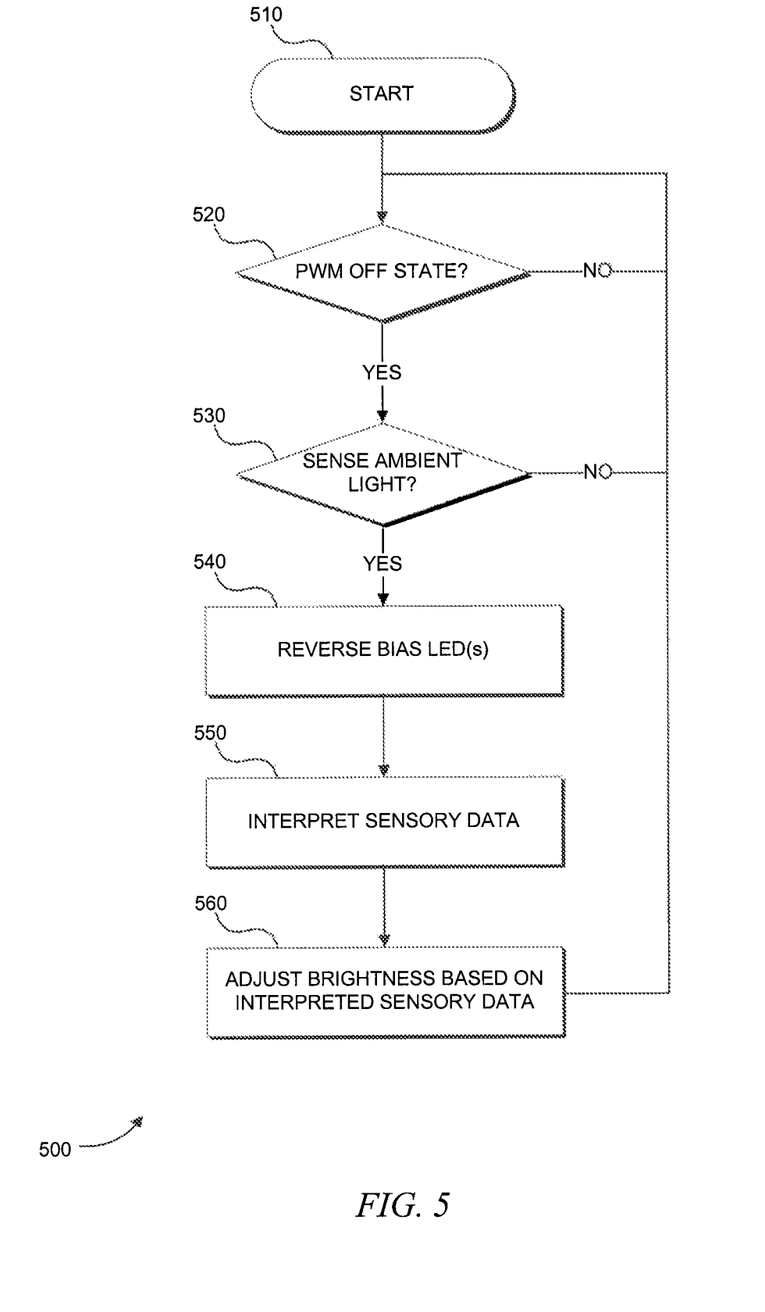
FIG. 5 illustrates an exemplary method for adjusting the brightness of an LCD based on ambient light conditions sensed by a backlight ambient light sensor, according to embodiments of the present invention.

FIG. 5 illustrates an exemplary method 500 for adjusting the brightness of LCD 100 based on ambient light conditions sensed by a backlight ambient light sensor (BALS), according to embodiments of the present invention. In describing method 500, reference is made to the features described above and illustrated in FIG. 4.

Method 500 of FIG. 5 starts at step 510 and transitions to step 520. At step 520, a determination is made at to whether PWM signal 450 is currently in an off state. If PWM signal 450 is not currently in an off state, method 500 remains at step 520 until PWM signal 450 is determined to be within an off state. If PWM signal 450 is currently in an off state, method 500 transitions to step 530.

At step 530, a determination is made as to whether the current ambient light conditions should be sensed. If not, method 500 transitions back to step 520 and waits for the next off state of PWM signal 450. If it is determined at step 530 that the current ambient light conditions should be sensed, method 500 transitions to step 540.

At step 540, one or more of the LEDs in LED array 240 are reverse biased. While reverse biased, the one or more LEDs in LED array 240 function as photo diodes and generate a current roughly proportional to the amount of ambient light impacting their surfaces. Following step 540, method 500 transitions to step 550.

At step 550, the magnitude of current produced by the one or more LEDs in LED array 240 is sensed and interpreted. This interpretation process can, in one embodiment, include the use of information regarding the state of the crystalline material of LCD 100 or information related to a number of pixel elements of LCD 100 having a brightness that fell within two or more brightness ranges during the display of one or more images, as discussed above. After the sensory information is interpreted, method 500 transitions to step 560.

At step 560, the brightness of one or more LEDs in LED array 240 is adjusted based on the sensory information. In one embodiment, the duty-cycle of PWM signal 450 is modulated based on the sensor information. For example, in a room where the sensed ambient light level is fairly bright, the duty cycle of PWM signal 450 can be adjusted to provide a high brightness level. However, in a room where the sensed ambient light level is fairly dim, the duty cycle of PWM signal 450 can be adjusted to provide a low brightness level.

4. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A backlight module comprising:
   a light-emitting diode (LED) array;
   a pulse-width modulator configured to provide a pulse-width modulated (PWM) signal;
   an LED array driver configured to forward bias the LED array to backlight a liquid crystal display (LCD) during an on time of the PWM signal and to reverse bias the LED array to sense an ambient light level during an off time of the PWM signal;
   a bias generator configured to provide a forward bias voltage to the LED array driver during the on time of the PWM signal for forward biasing the LED array and a reverse bias voltage to the LED array driver during the off time of the PWM signal for reverse biasing the LED array; and
   a brightness controller configured to modulate a duty-cycle of the PWM signal based on the ambient light level sensed by the LED array,
   wherein, before using the ambient light level sensed by the LED array to modulate the duty-cycle of the PWM signal, the brightness controller is configured to adjust the ambient light level sensed by the LED array based on a number of pixels of at least a portion of the LCD having a brightness that falls within one of a plurality of brightness ranges.

2. The backlight module of claim 1, wherein the bias generator is configured to provide the reverse bias voltage to the LED array driver only during select periods of the PWM signal.

3. The backlight module of claim 1, wherein the bias generator is configured to provide the reverse bias voltage to the LED array driver only during one out of every N periods of the PWM signal, where N is an integer number.

4. The backlight module of claim 1, wherein only a portion of the LED array is reverse biased by the LED array driver during the off time of the PWM signal.

5. The backlight module of claim 1, wherein the brightness controller is further configured to adjust an amount of ambient light that is able to pass through the LCD during the off time of the PWM signal.

6. The backlight module of claim 1, wherein the brightness controller is further configured to modulate the duty-cycle of the PWM signal based on a current alignment of one or more liquid crystal molecules of the LCD.

7. A method for controlling a backlight module that includes a light-emitting diode (LED) array, the method comprising:
providing a pulse-width modulated (PWM) signal;
forward biasing the LED array to backlight a liquid crystal display (LCD) during an on time of the PWM signal, wherein forward biasing the LED array comprises providing a forward bias voltage to the LED array during the on time of the PWM signal;
reverse biasing the LED array to sense an ambient light level during an off time of the PWM signal, wherein reverse biasing the LED array comprises providing a reverse bias voltage to the LED array during the off time of the PWM signal;
modulating a duty-cycle of the PWM signal based on the ambient light level sensed by the LED array, and
before modulating the duty-cycle of the PWM signal based on the ambient light level sensed by the LED array, adjusting the ambient light level sensed by the LED array based on a number of pixels of at least a portion of the LCD having a brightness that falls within one of a plurality of brightness ranges.

8. The method of claim 7, wherein the reverse biasing the LED array is only performed during select periods of the PWM signal.

9. The method of claim 7, wherein the reverse biasing the LED array is only performed during one out of every N periods of the PWM signal, where N is an integer number.

10. The method of claim 7, wherein only a portion of the LED array is reverse biased during the off time of the PWM signal.

11. The method of claim 7, further comprising:
adjusting an amount of ambient light that is able to pass through the LCD during the off time of the PWM signal.

12. The method of claim 7, wherein the modulating the duty-cycle of the PWM signal is further performed based on a current alignment of one or more liquid crystal molecules of the LCD.

13. A backlight module comprising:
a light-emitting diode (LED);
a pulse-width modulator configured to provide a pulse-width modulated (PWM) signal;
an LED driver configured to forward bias the LED to backlight a liquid crystal display (LCD) during an on time of the PWM signal and to reverse bias the LED to sense an ambient light level during an off time of the PWM signal;
a bias generator configured to provide a forward bias voltage to the LED driver during the on time of the PWM signal for forward biasing the LED and a reverse bias voltage to the LED driver during the off time of the PWM signal for reverse biasing the LED; and
a brightness controller configured to modulate a duty-cycle of the PWM signal based on the ambient light level sensed by the LED,
wherein, before using the ambient light level sensed by the LED to modulate the duty-cycle of the PWM signal, the brightness controller is configured to adjust the ambient light level sensed by the LED based on a number of pixels of at least a portion of the LCD having a brightness that falls within one of a plurality of brightness ranges.

14. The backlight module of claim 13, wherein the bias generator is configured to provide the reverse bias voltage to the LED driver only during select periods of the PWM signal.

15. The backlight module of claim 13, wherein the bias generator is configured to provide the reverse bias voltage to the LED driver only during one out of every N periods of the PWM signal, where N is an integer number.

16. The backlight module of claim 13, wherein the brightness controller is further configured to adjust an amount of ambient light that is able to pass through the LCD during the off time of the PWM signal.

17. The backlight module of claim 13, wherein the brightness controller is further configured to modulate the duty-cycle of the PWM signal based on a current alignment of one or more liquid crystal molecules of the LCD.

18. The backlight module of claim 13, wherein the brightness controller is further configured to coordinate with a graphics controller of the LCD to adjust an amount of ambient light that is able to pass through the LCD during the off time of the PWM signal.

19. The backlight module of claim 1, wherein the brightness controller is further configured to coordinate with a graphics controller of the LCD to adjust an amount of ambient light that is able to pass through the LCD during the off time of the PWM signal.

* * * * *